Oct. 6, 1936.　　　W. W. RIEDEL　　　2,056,535

HYDRAULIC SHOCK ABSORBER

Filed June 28, 1934

INVENTOR
WALTER W. RIEDEL
BY
Spencer, Hardman and Fehr
ATTORNEYS

Patented Oct. 6, 1936

2,056,535

UNITED STATES PATENT OFFICE 2,056,535

HYDRAULIC SHOCK ABSORBER

Walter W. Riedel, Dayton, Ohio, assignor to General Motors Corporation, Detroit, Mich., a corporation of Delaware Application June 28, 1934, Serial No. 732,744

10 Claims. (Cl. 267—8)

This invention relates to improvements in hydraulic shock absorbers.

It is among the objects of the present invention to provide a hydraulic shock absorber with an automatic control device which will adjust the shock absorber to vary its resistance to movements of the body and axle of the vehicle in accordance with the nature of the roadbed over which the vehicle is being operated.

A further object of the present invention is to provide a shock absorber having an automatic control device responsive to accelerations in the vertical movements of the vehicle body.

Further objects and advantages of the present invention will be apparent from the following description reference being had to the accompanying drawing wherein a preferred embodiment of the present invention is clearly shown.

Figure 1:
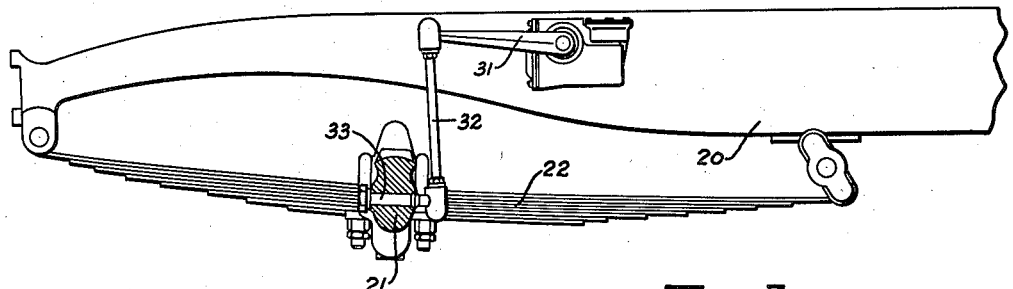
Figure 1 is a fragmentary side view of the vehicle chassis, a shock absorber equipped with the present invention being shown applied thereto.

Referring to the drawing, the numeral 20 designates the frame of the vehicle which is supported upon the axle 21 by springs 22, only one of which is shown. For the sake of clearness the roadwheels of the vehicle have been omitted from this view.

The shock absorber comprises a casing 23 providing a fluid reservoir 24 and a cylinder 25. A channel 26 provides communication between the fluid reservoir 24 and the interior of the cylinder 25.

A rocker shaft 30 is transversely supported by the casing, one end of said rocker shaft extending outside of the casing and having the shock absorber operating arm 31 attached thereto. The free end of this arm is swivelly secured to one end of a link 32 the other end of said link being swivelly secured to a member 33 anchored to the axle 21. Within the shock absorber casing the rocker shaft 30 has an operating lever 35 secured thereto so as to rotate therewith the free end of this lever lying adjacent the open end of the cylinder 25.

Within the cylinder 25 a piston 40 is provided, said piston forming a fluid displacement chamber 41 within the cylinder 25. The head of the piston has a passage 42 providing for the transfer of the fluid from one side of the piston to the other in response to its backward and forward movement. The inner surface of the piston head has an annular ridge 43 about the inner end of passage 42, this ridge providing a seat against which intake valve 44 is yieldably urged by a spring 45 which is supported in a cage 46. This cage is maintained in engagement with the inner surface of the piston head by a spring 47 interposed between the piston and the inner end of the cylinder 25, said spring 47 also maintaining the head of the piston 40 in constant engagement with the free end of the operating lever 35. The stem 51 of the pressure release valve 52 extends through an opening 50 provided in the intake valve 44. A spring 53, interposed between the valve 44 and an abutment pin 54 carried by valve stem 51, normally urges the pressure-release valve 52 into engagement with the valve 44 so that normally communication via opening 50 is cut off between the chamber 41 and the passage 42 in the head of the piston 40.

The structure so far described operates as follows: when the roadwheel of a vehicle strikes an obstruction in the roadbed the axle is thrust upwardly toward the spring 20 compressing the spring 22. The link 32 and the shock absorber operating lever 31 are thrust upwardly and consequently the rocker shaft 30 is rotated clockwise as regards Figures 1 and 2, thus moving the free end of the lever 35 away from the cylinder 25. The spring 47 will naturally urge the piston 40 to follow the movement of lever 35 and consequently fluid within the reservoir 25 acting through piston head passage 42 will move the valve 44 from engagement with seat 43 against the effect of spring 45. Now a substantially free flow of fluid is established from the reservoir 25 into the chamber 41.

When the spring 22 moves toward its normal load position, or, when the frame 20 of the vehicle moves upwardly away from the axle 21 a reverse movement of the shock absorber obtains and consequently lever 35 will push the piston 40 into the cylinder 25 against the effect of spring 47. Now pressure will be exerted upon the fluid within the displacement chamber 41 which pressure when reaching a predetermined degree will be exerted against the valve 52 to move it from engagement with valve 44 against the effect of spring 53 thereby to establish a restricted flow of fluid from chamber 41 through the opening 50 in valve 44 and passage 42 in piston 40 into the reservoir 24. The restriction to this fluid flow will resist shock absorber movement consequently the expanding movement of the spring 22 is resisted as well as the movement of the frame 20 away from axle 21.

One object of the present invention is to control the fluid flow from chamber 41 through the passage 26 and out of port 60 in response to and proportionately with accelerations in the movements of the shock absorber. This movement of the shock absorber is particularly the upward movement which may be termed the "rebound" movement of the vehicle frame 20.

This control device comprises an inertia weight 61 hingedly supported at one edge by a pin 62 rigidly carried by a depending tongue 63 provided on the cover 64. This cover 64 is secured to the shock absorber casing by screws 65. A properly gasketed plate 66 is clamped between the cover 64 and the shock absorber casing. This plate has a depending tongue 67 which provides one abutment member for the spring 68, the other end of the spring being attached to an abutment post 69 secured to the weight 61 by screw 70. An angular portion of the abutment 69 engages the member 71 which is adjustably carried by the cover 64 which, when operated in one direction, urges the weight 61 away from the cover and in the other direction permits the spring 68 to move the weight 61 in closer proximity to said cover. Thus member 71 is adapted to be actuated to vary the normal position in which the weight is held suspended by spring 68.

Figure 2:
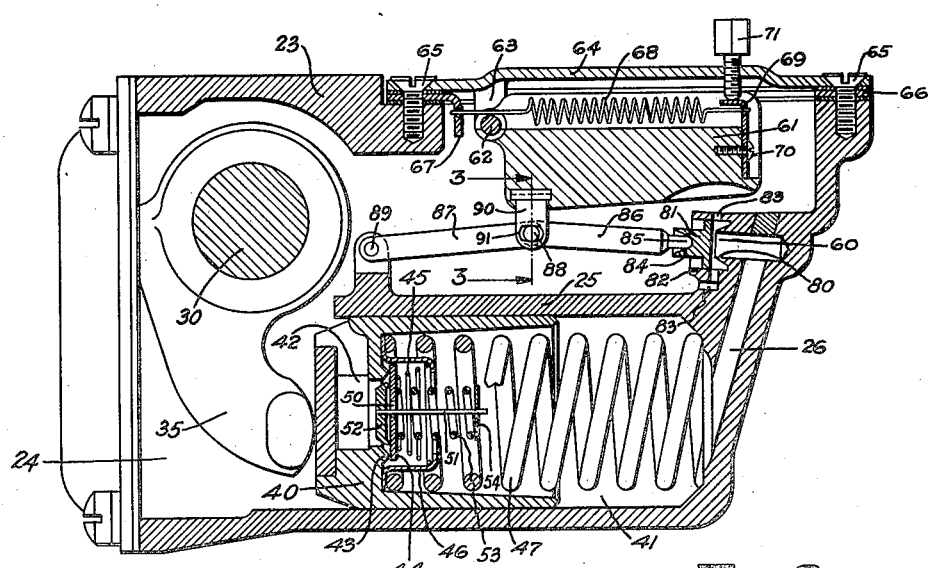
Figure 2 is a longitudinal sectional view taken through the shock absorber, certain portions thereof being shown in elevation for the sake of clearness.
Figure 3:
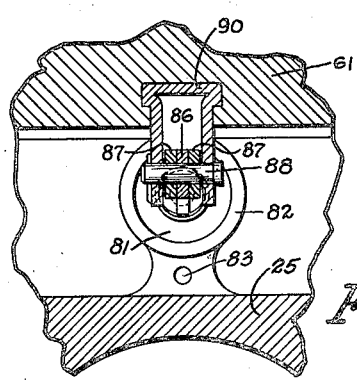
Figure 3 is an enlarged detail sectional view taken substantially along the line 3—3 of Figure 2.

The port 60 through which passage 26 discharges into reservoir 24 has an annular, sharp-edge valve seat 80 which is adapted to be engaged by a valve 81 slidably carried within a cylindrical extension 82 of the casing surrounding the port. Transverse openings 83 in the cylindrical extension 82 provide for the transfer of fluid from the port to the reservoir when the valve 81 is off the seat 80. The outer end of the valve 81 is recessed as at 84 to receive the rounded end of an extension 85 provided at one end of a link 86 which forms one member of a toggle joint. The end of this link opposite the extension 85 is hingedly attached to the other link 87 of the toggle joint by a pin 88. One end of the link 87 is pivoted to a fixed pin 89 carried by a lug formed in the wall of cylinder 25. A member 90 is secured to the weight 61, preferably molded therein, said member having an elongated slot 91 which fits over the pin 88 and operatively connects the weight with the hinge connection between the two links 86 and 87 of the toggle joint. This connection is such that when the weight 61 is in normal suspended position the toggle joint will be maintained in the position as shown in Figure 2, in which the pin 89 of toggle link 87 and the end of projection 85 of toggle 86 are closest together. Under these circumstances any fluid pressure exerted against valve 81 will move it from its seat 80 and maintain said valve against the rounded end of link extension 85. In this position port 60 is held open to permit a predetermined flow of fluid from said port through the transverse passages 83 into the reservoir 24.

This control device functions in the following manner: As has been said before when the frame 20 moves away from the axle 21 the shock absorber operates to move the piston 40 into the cylinder to exert pressure upon the fluid therein. Normally valve 81 may be moved the normal distance away from its seat 80 by the slightest pressure being exerted upon it and consequently under these conditions a flow of fluid will be permitted from chamber 41, passage 26, out of port 60 past the valve 81 through the openings 83 into the reservoir 24. Excessive pressure is relieved by the movement of the valve 52 from engagement with valve 44 to establish a flow through the piston head, as has been described. Now, if the upward movement of the frame 20 is accelerated to a predetermined degree, a relative movement between the weight 61 and the shock absorber casing obtains. Under these conditions the weight 61 will be moved about its pivot pin 62 in a clockwise direction as regards Figure 2 against the effect of spring 68. This movement of the weight 61 causes the member 90 to exert a pushing effort upon the pivot pin 88 of the toggle links 87 and 86, moving said links toward their aligned position so that their outer ends will be moved a greater distance apart, which movement results in the valve 81 being actuated toward its seat 80 and thereby increasing its restriction to the fluid flow from the port 60. It may clearly be seen that the valve 81 will be pushed toward the seat 80 proportionately to the acceleration of the movement of the frame 20 upwardly and consequently the restriction to the fluid flow from port 60 is proportionate to the acceleration of the frame movement. The position of the member 90 of the weight 61 relative to its pivotal point 62 together with the toggle joint provides for multiplication of the force exerted by the weight. That is, the leverage between the weight 61 and the valve 81 is of such a character that the actuating force of the weight 61 to move valve 81 is substantially increased. From this it may be seen that a comparatively small weight may be used to provide sufficient pushing effort to overcome comparatively high fluid pressure from port 60.

The element 71 may be connected to any suitable adjusting mechanism available at the seat of the driver in the vehicle whereby the shock absorber may be adjusted during the operation of the vehicle to vary its control of its body movements.

From the aforegoing it may be seen that applicant has provided a shock absorber with an automatic control capable of adjusting the shock absorber to vary its resistance to body and axle movement in accordance with the nature of the roadbed over which the vehicle is being operated.

While the embodiment of the present invention as herein disclosed, constitutes a preferred form, it is to be understood that other forms might be adopted, all coming within the scope of the claims which follow.

What is claimed is as follows:

1. A hydraulic shock absorber having a fluid displacement chamber provided with an outlet port; a fluid displacement member; a valve for said port; a yieldably suspended inertia weight in the shock absorber; a toggle joint connecting the weight and valve, and normally permitting the valve to maintain the port open, but adapted to multiply the force of the weight upon the valve to overcome the effect of fluid pressure acting directly upon the valve and tending to urge it into its port open position.

2. A hydraulic shock absorber having a fluid displacement chamber provided with an outlet port; a fluid displacement member; a valve for said port; an inertia weight; an adjustable stop; a spring urging said weight against the adjustable stop; and mechanical, force multiplying means connecting the weight and valve, and adapted to actuate the valve only in direct opposition to the fluid pressure tending to move the valve to open the port.

3. A hydraulic shock absorber having a fluid displacement chamber provided with an outlet port; a fluid displacement member; a valve for said port; an inertia weight; a spring urging the weight normally to engage a stationary part of the shock absorber; and mechanical, force multiplying means attached to the weight and adapted to be engaged by the valve for limiting its movement to open the port, said means urging the valve toward the port against the effect of the fluid pressure, in response to accelerations in the movement of the shock absorber upwardly.

4. A hydraulic shock absorber having a fluid displacement chamber provided with an outlet port; a fluid displacement member, a valve for said port; an inertia weight; a spring normally holding the weight against an adjustable stop on the shock absorber; a toggle joint connected to the weight and adapted to limit the movement of the valve to open the port, said weight acting through said toggle joint to actuate the valve against the fluid pressure tending to move the valve to open the port, for restricting the flow of fluid from said port in accordance with upward accelerations in the movement of the shock absorber.

5. A hydraulic shock absorber having a fluid displacement chamber provided with an outlet port; a fluid displacement member; a valve for said port; an inertia weight yieldably urged against an immovable portion of the shock absorber; a toggle joint, the outer end of one link of which is pivoted to the shock absorber, the outer end of the other link of the toggle joint engaging the valve to limit its port opening movement by fluid pressure; and a member attached to the weight and engaging the pivotal connection between the two toggle links.

6. A hydraulic shock absorber having a fluid displacement chamber provided with an outlet port; a fluid displacement member; a valve for said port; an inertia weight pivotally supported in the shock absorber; an adjustable stop; a spring normally holding the weight against the stop; a toggle joint comprising two links hinged together, the outer end of one being pivotally secured to the shock absorber, the outer end of the other engaging the valve to limit its movement to open the port in response to fluid pressure; and a member connecting the weight with the hinged joint of the toggle whereby the weight, acting through the toggle, actuates the valve against fluid pressure to restrict the flow of fluid from the port.

7. A hydraulic shock absorber having a fluid displacement chamber provided with an outlet port; a valve adapted to restrict the flow of fluid through said port; an inertia weight held suspended against an adjustable member on the shock absorber by a spring, said weight being movable away from said member in response to accelerations in the upward movement of the shock absorber; and means operatively connecting the weight and valve, said means normally limiting the movement of the valve to open the port and being adapted to multiply the force of said weight against the valve having fluid pressure acting directly against it tending to move it to full port opening position.

8. A hydraulic shock absorber having a fluid displacement chamber provided with an outlet port; a toggle joint comprising two links hinged together, the outer end of one link being pivotally secured to the shock absorber; an inertia weight; an adjustable stop; a spring normally holding the weight against the stop; means securing the weight to the hinged connection of the links; and a valve for the port, urged by fluid pressure against the outer end of the other link which limits the full port open position of the valve and which is adapted to actuate the valve against the fluid pressure to restrict the fluid flow from said port, in response to movement of the weight by accelerations in the upward movement of the shock absorber.

9. In a hydraulic shock absorber having a fluid displacement chamber provided with an outlet port, the combination with an inertia mass; a force multiplying means connected with said mass; and a valve for said port, movable freely from port closing position into engagement with said means and adapted to be adjusted by the inertia mass acting through said means to increase its restriction to fluid flow from said port.

10. In a hydraulic shock absorber having a fluid displacement chamber provided with an outlet port, the combination with an inertia mass; a toggle connected to said mass and adapted to be actuated thereby; and a valve for the port, movable freely from said port into engagement with the toggle and adapted to be adjusted by the weight acting through said toggle, to increase its restriction to fluid flow from said port.

WALTER W. RIEDEL.